United States Patent
Hsu et al.

(10) Patent No.: US 10,977,420 B2
(45) Date of Patent: *Apr. 13, 2021

(54) METHOD OF DECOMPOSING A LAYOUT FOR MULTIPLE-PATTERNING LITHOGRAPHY

(71) Applicant: Taiwan Semiconductor Manufacturing Company Limited, Hsinchu (TW)

(72) Inventors: Meng-Kai Hsu, Hsinchu County (TW); Wen-Hao Chen, Hsinchu (TW)

(73) Assignee: Taiwan Semiconductor Manufacturing Company Limited, Hsinchu (TW)

(*) Notice: Subject to any disclaimer, the term of this patent is extended or adjusted under 35 U.S.C. 154(b) by 16 days.

This patent is subject to a terminal disclaimer.

(21) Appl. No.: 16/724,704

(22) Filed: Dec. 23, 2019

(65) Prior Publication Data

US 2020/0125787 A1  Apr. 23, 2020

Related U.S. Application Data

(60) Continuation of application No. 16/397,483, filed on Apr. 29, 2019, now Pat. No. 10,515,186, which is a
(Continued)

(51) Int. Cl.
*G06F 17/50* (2006.01)
*G03F 7/00* (2006.01)
(Continued)

(52) U.S. Cl.
CPC .......... *G06F 30/398* (2020.01); *G03F 7/0035* (2013.01); *G03F 7/705* (2013.01);
(Continued)

(58) Field of Classification Search
CPC ............. G06F 17/5081; G06F 17/5072; G06F 2217/12; G06F 30/398; G06F 30/392;
(Continued)

(56) References Cited

U.S. PATENT DOCUMENTS

5,563,012 A * 10/1996 Neisser .................... G03F 1/29
430/22
6,194,105 B1   2/2001 Shacham et al.
(Continued)

*Primary Examiner* — Phallaka Kik
(74) *Attorney, Agent, or Firm* — Jones Day (57) ABSTRACT

A method of decomposing a layout for multiple-patterning lithography includes receiving an input that represents a layout of a semiconductor device. The layout includes a plurality of conductive lines of a cell. A first set of conductive lines are overlaid by a second set of conductive lines. The method further includes partitioning the second set of conductive lines into groups. A first group has a different number of conductive lines from the second set than a second group. The method further includes assigning conductive lines from the first set overlaid by conductive lines of the first group to a first photomask and assigning conductive lines from the first set overlaid by conductive lines of the second group to second and third photomasks.

20 Claims, 10 Drawing Sheets

Related U.S. Application Data division of application No. 15/456,883, filed on Mar. 13, 2017, now Pat. No. 10,275,562.

(60) Provisional application No. 62/427,177, filed on Nov. 29, 2016.

(51) Int. Cl.
| | |
|---|---|
| *G06F 30/398* | (2020.01) |
| *G03F 7/20* | (2006.01) |
| *G06F 30/392* | (2020.01) |
| *H01L 21/027* | (2006.01) |
| *H01L 21/311* | (2006.01) |
| *H01L 21/768* | (2006.01) |
| *H01L 21/00* | (2006.01) |
| *G06F 119/18* | (2020.01) |

(52) U.S. Cl.
CPC ...... *G03F 7/70433* (2013.01); *G03F 7/70466* (2013.01); *G06F 30/392* (2020.01); *H01L 21/0274* (2013.01); *H01L 21/31144* (2013.01); *H01L 21/76802* (2013.01); *H01L 21/76877* (2013.01); *G06F 2119/18* (2020.01); *H01L 21/76816* (2013.01)

(58) Field of Classification Search
CPC ......... G06F 2219/18; G03F 7/00; G21K 5/00; H01L 21/0274; H01L 21/31144; H01L 21/76802; H01L 21/76877
USPC ........... 716/55, 51, 54; 378/34, 35; 430/4, 5; 700/98, 120, 121; 250/492.22
See application file for complete search history.

(56) References Cited

U.S. PATENT DOCUMENTS

| | | | |
|---|---|---|---|
| 6,225,013 | B1 | 5/2001 | Cohen et al. |
| 6,760,638 | B1 | 7/2004 | Love et al. |
| 10,103,206 | B2 | 10/2018 | Kamiya |
| 10,275,562 | B2 * | 4/2019 | Hsu ................ H01L 21/76877 |
| 10,360,337 | B2 | 7/2019 | Biswas et al. |
| 10,515,186 | B2 * | 12/2019 | Hsu ..................... G06F 30/398 |
| 2001/0052966 | A1 | 12/2001 | Fujitsuka et al. |
| 2006/0121634 | A1 | 6/2006 | Ahn |
| 2006/0146255 | A1 | 7/2006 | Ahn |
| 2006/0146256 | A1 | 7/2006 | Ahn |
| 2007/0273804 | A1 | 11/2007 | Kwack et al. |
| 2012/0249993 | A1 | 10/2012 | Kajiyama et al. |
| 2013/0126978 | A1 | 5/2013 | Becker et al. |
| 2015/0243515 | A1 | 8/2015 | Yuan et al. |
| 2015/0278428 | A1 | 10/2015 | Wang et al. |

* cited by examiner

METHOD OF DECOMPOSING A LAYOUT FOR MULTIPLE-PATTERNING LITHOGRAPHY

CROSS-REFERENCE TO RELATED APPLICATION

This application is a continuation application of U.S. patent application Ser. No. 16/397,483, filed Apr. 29, 2019, now U.S. Pat. No. 10,515,186 which is a divisional application of U.S. patent application Ser. No. 15/456,883, filed Mar. 13, 2017, now U.S. Pat. No. 10,275,562 which claims priority to U.S. Provisional Application No. 62/427,177, filed Nov. 29, 2016, all of which are incorporated herein by reference in their entireties.

BACKGROUND

Photolithography is a technique used in the manufacture of an integrated circuit (IC) for transferring a pattern of a photomask to a photoresist. A substrate may be then etched using the photoresist as a mask.

One type of the photolithography is single-patterning lithography that transfers a pattern to a photoresist using a single photomask. Such a pattern may be also transferred to the photoresist using two or more photomasks by multi-patterning lithography, which is another type of the photolithography.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
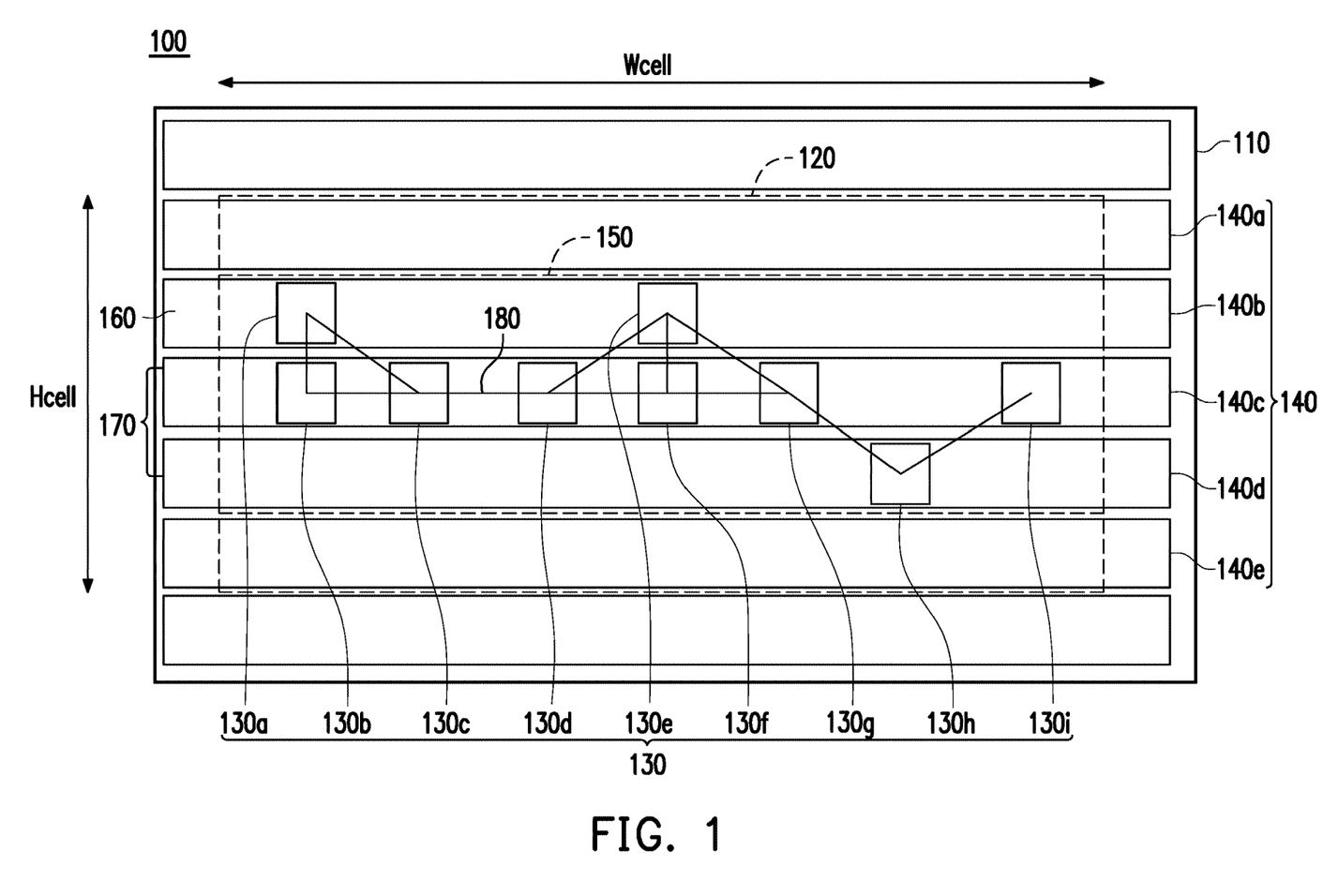
FIG. 1 is a schematic top view illustrating an exemplary layout of a cell in accordance with some embodiments.

In the design of a layout, e.g., layout 100 in FIG. 1 (top view), of a cell, e.g., cell 120, of a semiconductor device, vertical conductive lines (into the page), e.g., vertical conductive lines 130a-130i, of the cell 120 are placed at various locations of the layout 100. The vertical conductive lines 130a-130i serve as vias that couple the cell 120 to power supply lines, e.g., VDD and VSS supply lines, and/or that interconnect components, such as transistors, of the cell 120. These couplings connect structures on layers, such as a substrate 110, a first conductive layer 130 atop the substrate 110 (from which the vias 130a-130i are formed), and a second conductive layer 140 above the first conductive layer 130. The cell 120 is configured to perform a cell function. For example, the cell can implement an inverter configured to invert a signal from low to high, or vice versa.

Subsequent to the layout 100 design, photolithography is performed to realize the layout 100. There are two types of photolithography, namely single-patterning lithography and multi-patterning lithography. The single-patterning lithography transfers a pattern of a layout to a photoresist using a single photomask. A minimum pitch rule associated with the photolithography requires vertical conductive lines, e.g., vertical conductive lines 130a-130i, be of equal to or greater than a minimum pitch. Pitch is, in one example, the horizontal distance between centers of an adjacent pair of the vertical conductive lines. At such a minimum pitch, a pattern of the vertical conductive lines may be transferred by the single-patterning lithography to a photoresist with sufficient resolution. Less than the minimum pitch, the resolution of a photoresist pattern begins to blur. For example, FIG. 1 includes two vertical conductive lines, e.g., the conductive lines 130a, 130e, that comply with the minimum pitch rule, i.e., the horizontal distance between the vertical conductive lines 130a, 130e in the depiction of FIG. 1 is greater than or equal to the minimum pitch. As such, the single-patterning lithography may transfer a pattern of the vertical conductive lines 130a, 130e to a photoresist using the same photomask.

The example of FIG. 1 further includes two vertical conductive lines, e.g., the conductive lines 130c, 130d, that do not comply, i.e., violate, the minimum pitch rule because they are arranged at a pitch less than the minimum and thus a conflict edge occurs therebetween. Conflict edge is indicated herein by a line, e.g., line 180, that connects two vertical conductive lines in conflict with each other, i.e., that cannot be assigned to the same photomask. As such, a pattern of the vertical conductive lines 130c, 130d is not transferrable by the single-patterning lithography. Therefore, a layout of the vertical conductive lines 130c, 130d has to be decomposed for creation using multi-patterning lithography.

Multi-patterning lithography can be double-patterning lithography, triple-patterning lithography, or more, e.g., n-patterning lithography. In multi-patterning lithography, vertical conductive lines, e.g., the vertical conductive lines 130c, 130d, connected by a conflict edge, i.e., in conflict with each other, are assigned to different photomasks. For example, double-patterning lithography can be used to transfer patterns of the vertical conductive line 130c, 130d to a photoresist using first and second photomasks, respectively.

While vertical conductive lines 130c, 130d could be formed using a double-patterning lithography, as described immediately above, a conflict would still be present between the vertical conductive lines 130a, 130b, between the vertical conductive lines 130b, 130c, and between the vertical conductive lines 130a, 130c, such that they could not be included on the same photomask. Thus, in FIG. 1, three vertical conductive lines, e.g., the conductive lines 130a, 130b, 130c, are in conflict with each other. A layout of the vertical conductive lines 130a, 130b, 130c is therefore not decomposable for the double-patterning lithography. Such a layout may, however, be decomposed for the triple-patterning lithography. For example, the triple-patterning lithography may transfer patterns of the vertical conductive lines 130a, 130b, 130c to a photoresist using first, second, and third photomasks, respectively.

The example of FIG. 1 further includes four vertical conductive lines, e.g., the conductive lines 130d, 130e, 130f, 130g, connected by five conflict edges. A layout of the vertical conductive lines 130d, 130e, 130f, 130g, like the layout of the vertical conductive lines 130a, 130b, 130c, is decomposable for the triple-patterning lithography. For example, the triple-patterning lithography may transfer patterns of the vertical conductive lines 130d, 130g to a first photoresist using a first photomask and the vertical conductive lines 130e, 130f using second and third photomasks, respectively.

The present disclosure provides various exemplary methods of decomposing a layout, e.g., the layout 100 in FIG. 1, of a cell, e.g., cell 120, of a semiconductor device for limited-level patterning lithograph, e.g., triple-patterning lithography. The semiconductor device, e.g., an application specific integrated circuit (ASIC), includes a cell, e.g., cell 120, having a cell height (Hcell) and a cell width (Wcell). The cell 120 is configured to perform a cell function, e.g., a NOT gate (or inverter) that inverts a signal from low to high or vice versa. In some embodiments, the cell 120 includes an AND gate, a NAND gate, an OR gate, a NOR gate, an XOR gate, an XNOR gate, another logic gate, or a combination thereof. Such a cell 120 can be termed as a standard cell. In other embodiments, the cell 120 includes a logic gate and a passive/active device, e.g., a resistor, a capacitor, an inductor, a transistor, a diode, or the like.

The example cell 120 includes a substrate 110 and first and second conductive layers 130, 140. The first and second conductive layers 130, 140 serve to couple the cell 120 to power supply lines, e.g., VDD and VSS supply lines, and/or to interconnect components, e.g., transistors, of the cell 120. The first conductive layer 130 is above the substrate 110 and includes a plurality of vertical conductive lines 130a-130i, i.e., vias. The second conductive layer 140 is above the first conductive layer 130 and includes a plurality of horizontal conductive lines 140a-140e.

An exemplary method of decomposing the layout 100 for triple-patterning lithography includes partitioning the horizontal conductive lines 140b-140d into first and second groups 160, 170. The first group 160 includes one horizontal conductive line, e.g., the conductive line 140b. The second group 170 includes two horizontal conductive lines, e.g., the conductive lines 140c, 140d. The method further includes assigning the vertical conductive lines, i.e., the conductive lines 130a, 130e, overlaid by, i.e., connected to, the horizontal conductive line, i.e., the conductive line 140b, in the first group 160 to a first photomask. As illustrated in FIG. 1, the vertical conductive lines 130a, 130e comply with the minimum pitch rule. As such, a pattern of the vertical conductive lines 130a, 130e may be transferred to a photoresist using the first photomask. Because conflicts exist within the vertical conductive lines 130b-130d and 130f-130i of the second group 170, further adjustment may be performed.

Figure 2:
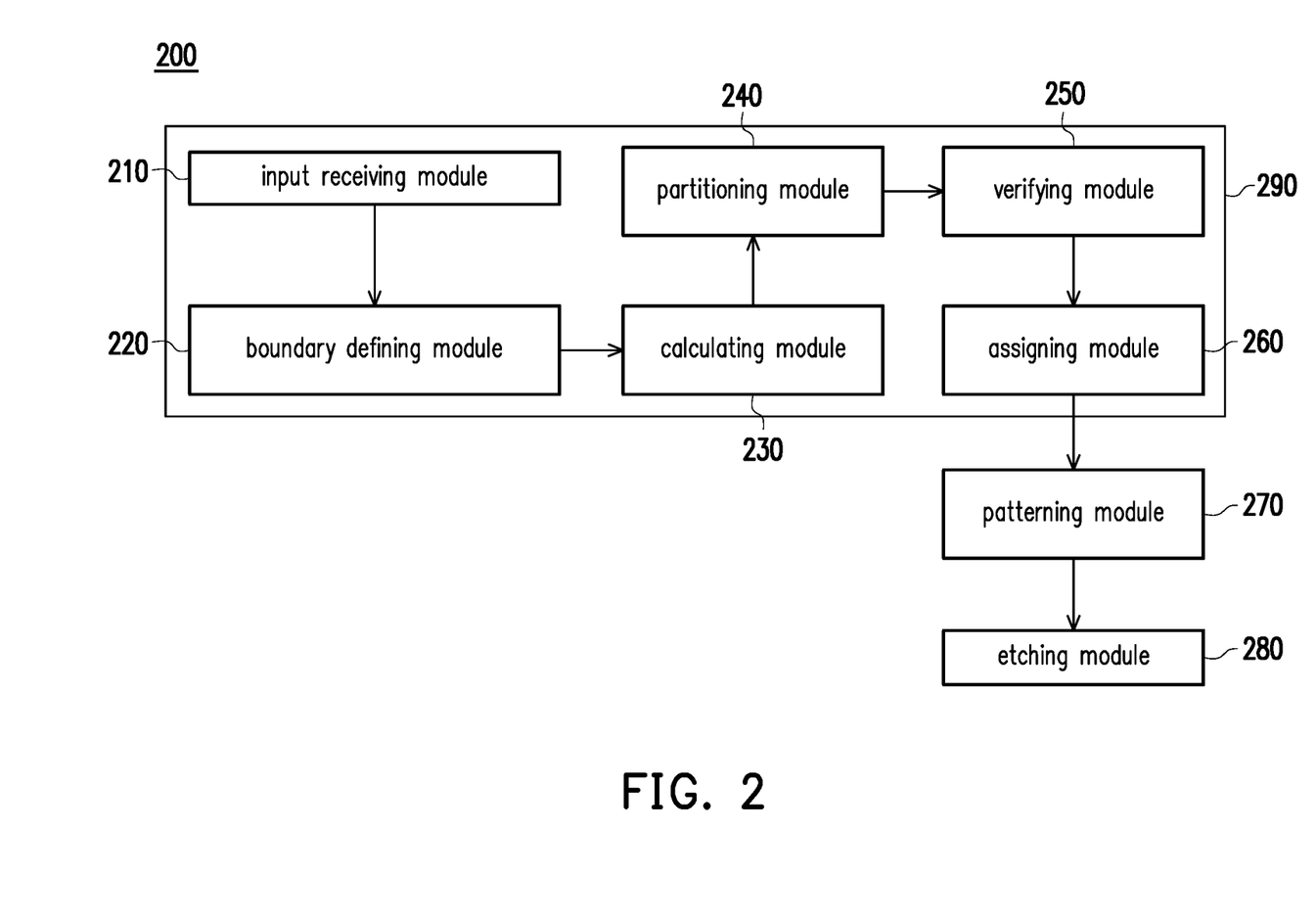
FIG. 2 is a block diagram illustrating an exemplary decomposition system in accordance with some embodiments.

FIG. 2 is a block diagram illustrating an exemplary decomposition system 200 in accordance with some embodiments. The system 200 is configured to decompose layouts of cells of a semiconductor device for triple-patterning lithography and to manufacture the semiconductor device per the layout. As illustrated in FIG. 2, the system 200 includes an input receiving module 210, a boundary defining module 220, a calculating module 230, a partitioning module 240, a verifying module 250, an assigning module 250, a patterning module 270, and an etching module 280.

The input receiving module 210 is configured to receive an input that represents a layout, e.g., layout 100, of a cell, e.g., cell 120, of a semiconductor device. The cell 120 includes a first conductive layer, e.g., conductive layer 130, that includes a plurality of vertical conductive lines e.g., conductive lines 130a-130i, and a second conductive layer, e.g., conductive layer 140, that includes a plurality of horizontal conductive lines, e.g., the conductive lines 140a-140e.

The boundary defining module 220 is connected to the input receiving module 210 and is configured to define a boundary, e.g., boundary 150, enclosing the vertical conductive lines, e.g., the conductive lines 130a-130i.

The calculating module 230 is connected to the boundary defining module 220 and is configured to perform a modulo operation that evaluates the expression, n mod 3, where n is the number of horizontal conductive lines, e.g., conductive lines 140b-140d, overlying, i.e., connected to, vertical conductive lines, e.g., conductive lines 130a-130i, enclosed by the boundary, e.g., boundary 150.

A modulo operation obtains a remainder after division of a number by another number. For example, when n=3, the calculating module 230 obtains a 0, a 1 when n=4, a 2 when n=5, and so on and so forth. As will be described below, the number obtained by the calculating module 230 will be used during partitioning of the horizontal conductive lines into groups.

The partitioning module 240 is connected to the calculating module 230 and is configured to partition the horizontal conductive lines, e.g., conductive lines 140b-140d, overlying the vertical conductive lines, e.g., conductive lines 130a-130i, enclosed by the boundary, e.g., boundary 150, into one or more first groups, e.g., group 160, and one or more second groups, e.g., group 170. In this embodiment, each first group has one horizontal conductive line, e.g., conductive line 140*b*. Each second group has two horizontal conductive lines, e.g. conductive lines 140*c*, 140*d*.

As will be described below, the vertical conductive lines, e.g., conductive lines, 130*a*, 130*e*, overlaid by the horizontal conductive line, e.g., conductive line 140*b*, in the first group(s), e.g., the group 160, will be assigned to a first photomask. The vertical conductive lines, e.g., conductive lines 130*b*-130*d*, 130*f*-130*i*, overlaid by the horizontal conductive lines, e.g., conductive lines 140*c*, 140*d*, in the second group(s), e.g., the group 170, will be assigned to second and third photomasks.

The partitioning module 240 is further configured to partition the horizontal conductive lines such that the first group(s) and the second group(s) are alternately arranged from top to bottom of the boundary, e.g., boundary 150.

The partitioning module 240 is further configured to partition the horizontal conductive lines starting with a first group, e.g., group 160, from the top of the boundary, e.g., boundary 150, when the calculating module 230 obtains a 0 or 1 value.

The partitioning module 240 is further configured to partition the horizontal conductive lines starting with a second group, e.g., group 170, from the top of the boundary, e.g., boundary 150, when the calculating module 230 obtains a 2 value.

The verifying module 250 is connected to the partitioning module 240 and is configured to verify whether the vertical conductive lines, e.g., conductive lines 130*a*, 130*e*, overlaid by the horizontal conductive line, e.g., conductive line 140*b*, in the first group(s), e.g., the group 160, comply with the minimum pitch rule.

The verifying module 240 is further configured to verify whether the vertical conductive lines, e.g., conductive lines 130*b*-130*d*, 130*f*-130*i*, overlaid by the horizontal conductive lines, e.g., conductive lines 140*c*, 140*d*, in the second group(s), e.g., the group 170, is decomposable for the double-patterning lithography.

The assigning module 260 is connected to the verifying module 250 and is configured to assign the vertical conductive lines, e.g., conductive lines 130*a*, 130*e*, overlaid by the horizontal conductive line, e.g., conductive line 140*b*, in the first group(s), e.g., the group 160, to a first photomask.

The assigning module 260 is further configured to assign the vertical conductive lines overlaid by the horizontal conductive lines in the second group(s) to second and third photomasks.

The patterning module 270 is connected to the assigning module 260 and is configured to pattern the first photomask with the vertical conductive lines assigned to the first photomask and to transfer a pattern of the first photomask to a first photoresist.

The patterning module 270 is further configured to pattern the second photomask with the vertical conductive lines assigned to the second photomask and to transfer a pattern of the second photomask to a second photoresist.

The patterning module 270 is further configured to pattern the third photomask with the vertical conductive lines assigned to the third photomask and to transfer a pattern of the third photomask to a third photoresist.

The etching module 280 is connected to the patterning module 270 and is configured etch a substrate using the first, second, and third photoresists as masks.

The modules 210-260 are implemented as a set of executable instructions 290 stored in a non-transitory computer readable storage medium. Those set of executable instructions when executed by a processor of a computing device causes the computing device to decompose a layout of a cell for triple patterning lithography, as described below. The storage medium may be connected to the computing device through a bus structure or a media interface of the computing device and/or through a network, e.g., a local area network (LAN) or a wide area network (WAN). The storage medium may be in the form of a hard disk drive (HDD) (e.g., internal or external HDD), an optical disc (e.g., CD-ROM and DVD-ROM), a memory device (e.g., universal serial bus (USB) memory device), a memory card, any suitable storage medium, or a combination thereof.

The patterning module 270 and the etching module 280 constitute fabrication equipment for manufacturing a semiconductor device, as described below. In this embodiment, the fabrication equipment is connected to the computing device, i.e., the patterning module 270 is connected to the assigning module 250, through a network, e.g., a LAN or a WAN, via which the patterning module 270 accesses an output of the assigning module 250. In an alternative embodiment, the fabrication equipment is not connected to the EDA computer device. In such an alternative embodiment, the output of the assigning module 250 may be provided to the patterning module 270 using, e.g., an external HDD, an optical disc, a USB memory device, a memory card, any suitable storage medium, or a combination thereof.

Figure 3:
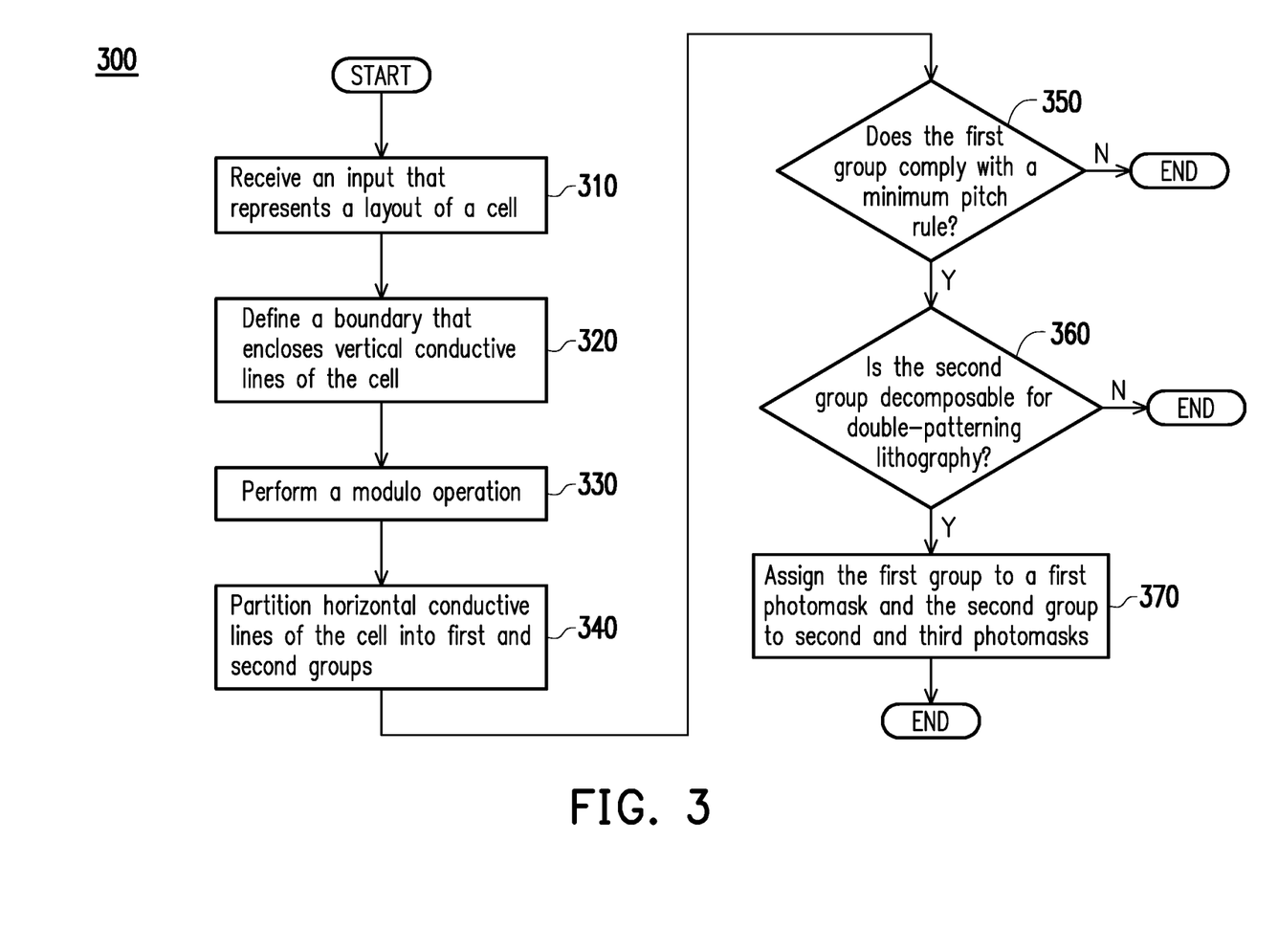
FIG. 3 is a flow chart illustrating an exemplary method of decomposing a layout of a cell for triple-patterning lithography.

FIG. 3 is a flow chart illustrating an exemplary method 300 of decomposing the cell layout 100 for triple-patterning lithography in accordance with some embodiments. The method 300 will now be described with further reference to FIGS. 1 and 2 for ease of understanding. It should be understood that the method 300 is applicable to structures other than those of FIGS. 1 and 2. In operation 310, the input receiving module 210 receives an input that represents the layout 100. In operation 320, the boundary defining module 220 defines a boundary 150 that encloses the vertical conductive lines 130*a*-130*i*.

In operation 330, the calculating module 230 performs a modulo operation that evaluates the expression, n mod 3, where n is the number of the horizontal conductive lines 140*b*, 140*c*, 140*d* overlying the vertical conductive lines 130*a*-130*i* enclosed by the boundary 150. In this embodiment, the calculating module 230 obtains a 0 value because n=3.

In operation 340, the partitioning module 240 partitions the horizontal conductive lines 140*b*, 140*c*, 140*d* overlying the vertical conductive lines 130*a*-130*i* enclosed by the boundary 150 into groups 160, 170. In this embodiment, the partitioning module 240 starts with the group 160 from a top of the boundary 150 because a 0 value is obtained in operation 330. As illustrated in FIG. 1, the group 160 has one horizontal conductive line, i.e., the conductive line 140*b*. The group 170 has two horizontal conductive lines, i.e., the conductive lines 140*c*, 140*d*.

The flow proceeds to operation 350. In operation 350, the verifying module 250 verifies whether the vertical conductive lines 130*a*, 130*e* overlaid by the horizontal conductive line 140*b* in the group 160 comply with the minimum pitch rule. If it is verified that the vertical conductive lines 130*a*, 130*e* comply with the minimum pitch rule, the flow proceeds to operation 360. Otherwise, the flow terminates and the layout 100 has to be redesigned.

In operation 360, the verifying module 250 verifies whether a layout of the vertical conductive lines 130*b*-130*d*, 130*f*-130*i* overlaid by the horizontal conductive lines 140*c*, 140*d* in the group 170 is decomposable for the double-patterning lithography. If it is verified that the layout of the vertical conductive lines 130*b*-130*d*, 130*f*-130*i* is decomposable for the double-patterning lithography, the flow proceeds to operation 370. Otherwise, the flow terminates and the layout 100 has to be redesigned.

In operation 370, the assigning module 260 assigns the vertical conductive lines 130a, 130e overlaid by the horizontal conductive line 140b in the group 160 to a first photomask. The assigning module 260 further assigns the vertical conductive lines 130b, 130d, 130g, 130i overlaid by the horizontal conductive line 140c in the group 170 to a second photomask. The assigning module 260 further assigns the vertical conductive lines 130c, 130f, 130h overlaid by the horizontal conductive lines 140c, 140d in the group 170 to a third photomask.

After the cell layout 100 is decomposed for triple-patterning lithography, the cell layout 100 is placed at a location in a layout of a semiconductor device. Operations 310-370 are then repeated to populate the semiconductor device layout with cell layouts. Thereafter, a routing operation is performed on the semiconductor device layout to connect cells to the power supply lines and to other cells and to interconnect cell components, enabling the semiconductor device layout to perform a circuit function.

Figure 4:
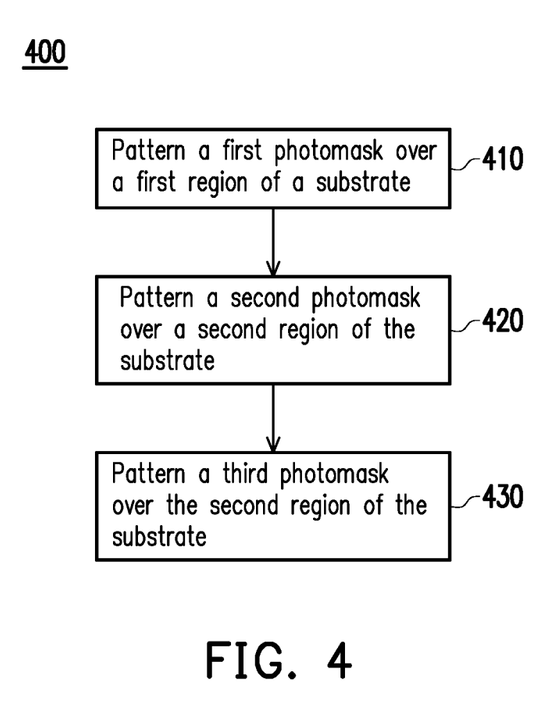
FIG. 4 is a flow chart illustrating an exemplary method of manufacturing a semiconductor device in accordance with some embodiments.

FIG. 4 is a flow chart illustrating an exemplary method 400 of manufacturing a semiconductor device in accordance with some embodiments. The method 400 will now be described with further reference to FIGS. 1 and 2 for ease of understanding. It should be understood that the method 400 is applicable to structures other than those of FIGS. 1 and 2. In operation 410, the patterning module 270 patterns a first photomask over a region 160 of the substrate 110 with the vertical conductive lines 130a, 130e. Prior to operation 410, the method 400 further includes: receiving the substrate 110; depositing a first photoresist over the substrate 110; depositing the first photomask over the first photoresist. After operation 410, the method 400 further includes transferring a pattern of the first photomask to the first photoresist; removing the first photomask; etching, such as by the etching module 280, the substrate 110 using the first photoresist as a mask to form via holes; and stripping the first photoresist.

In operation 420, the patterning module 270 patterns a second photomask over a region 170 of the substrate 110 with the vertical conductive lines 130b, 130d, 130g, 130i. The region 170 has a size twice a size of the region 160. Prior to operation 420, the method 400 further includes: depositing a second photoresist over the substrate 110; depositing the second photomask over the second photoresist. After operation 420, the method 400 further includes: transferring a pattern of the second photomask to the second photoresist; removing the second photomask; etching, such as by the etching module 280, the substrate 110 using the second photoresist as a mask to form via holes; and stripping the second photoresist.

In operation 430, the patterning module 270 patterns a third photomask over the region 570 of the substrate 110 with the vertical conductive lines 130c, 130f, 130h. Prior to operation 430, the method 400 further includes: depositing a third photoresist over the substrate 110; depositing the third photomask over the third photoresist. After operation 430, the method 400 further includes: transferring a pattern of the third photomask to the third photoresist; removing the third photomask; etching, such as by the etching module 280, the substrate 110 using the third photoresist as a mask to form via holes; and stripping the third photoresist. The method 400 further includes depositing metal in the via holes to form the vertical conductive lines 130a-130i and depositing metal to form one horizontal conductive line, i.e., the conductive line 140b, over the region 160 of the substrate 110 and two horizontal conductive lines, i.e., the conductive lines 140c, 140d, over the region 170 of the substrate 110.

Figure 5:
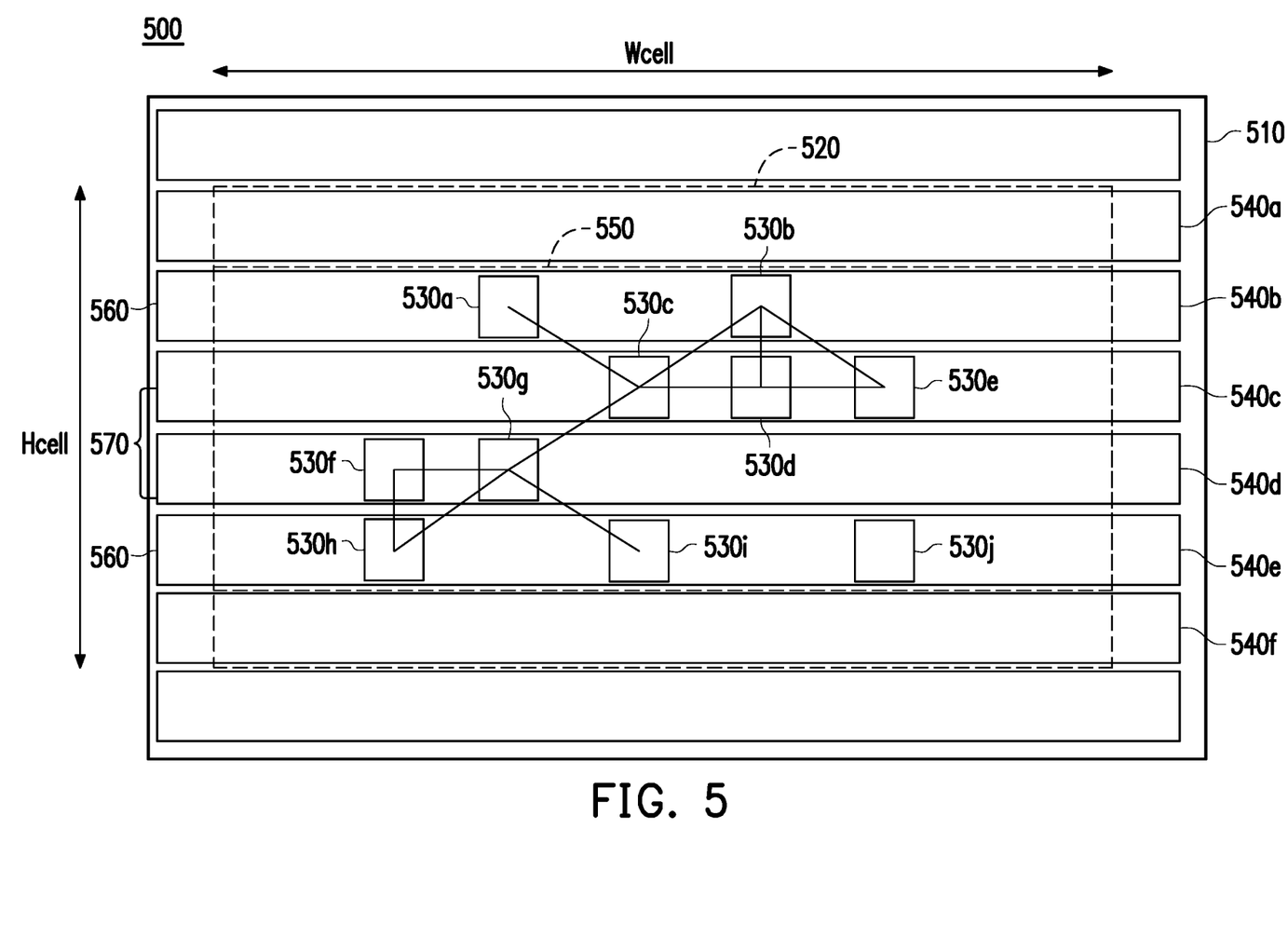
FIG. 5 is a schematic top view illustrating another exemplary layout of a cell in accordance with some embodiments.

FIG. 5 is a schematic view of another exemplary layout 500 of a cell of a semiconductor device in accordance with some embodiments. The semiconductor device includes a substrate 510 and a cell 520. As illustrated in FIG. 5, the cell 520 is enclosed by a boundary (indicated by dash lines), is of a height (Hcell) and a width (Wcell), and includes first and second conductive layers.

The first conductive layer is disposed above the substrate 110 and includes vertical conductive lines 530a-530j that each extend substantially perpendicular to a surface of the substrate 510. The second conductive layer is disposed above the first conductive layer and includes horizontal conductive lines 540a-540f that are arranged in a row and that each extend along the length of the substrate 510.

The method 300 will now be described with further reference to FIGS. 2 and 5 for ease of understanding. It should be understood that the method 300 is applicable to structures other than those of FIGS. 2 and 5. In operation 310, the input receiving module 210 receives an input that represents the cell layout 500. In operation 320, the boundary defining module 220 defines a boundary 550 that encloses the vertical conductive lines 530a-530j.

In operation 330, the calculating module 230 performs a modulo operation that evaluates the expression, n mod 3, where n is the number of the horizontal conductive lines 540b-540e overlying the vertical conductive lines 530a-530j enclosed by the boundary 550. In this embodiment, the calculating module 230 obtains a 1 because n=4.

In operation 340, the partitioning module 240 partitions the horizontal conductive lines 540b-540e overlying the vertical conductive lines 530a-530j enclosed by the boundary 550 into groups 560, 570. In this embodiment, the partitioning module 240 partitions the horizontal conductive lines 540b-540e such that the groups 560, 570 are alternately arranged from top to bottom of the boundary 550. The partitioning module 240 partitions the horizontal conductive lines 540b-540e starting with a group 560 from the top of the boundary 550 because a 1 value is obtained in operation 330. As illustrated in FIG. 5, each group 560 has one horizontal conductive line, i.e., the conductive line 540b/540e. The group 570 has two horizontal conductive lines, i.e., the conductive lines 540c, 540d.

The flow proceeds to operation 350. In operation 350, the verifying module 250 verifies whether the vertical conductive lines 530a, 530b, 530h, 530i, 530j overlaid by the horizontal conductive lines 540b, 540e in the groups 560 comply with the minimum pitch rule. If it is verified that the vertical conductive lines 530a, 530b, 530h, 530i, 530j comply with the minimum pitch rule, the flow proceeds to operation 360. Otherwise, the flow terminates and the layout 500 has to be redesigned.

In operation 360, the verifying module 250 verifies whether a layout of vertical conductive lines 530c, 530d, 530e, 530f, 530g overlaid by the horizontal conductive lines 540c, 540d in the group 570 is decomposable for the double-patterning lithography. If it is verified that the layout of the vertical conductive lines 530c, 530d, 530e, 530f, 530g is decomposable for the double-patterning lithography, the flow proceeds to operation 370. Otherwise, the flow terminates and the layout 500 has to be redesigned.

In operation 370, the assigning module 260 assigns the vertical conductive lines 530a, 530b, 530h, 530i, 530j overlaid by the horizontal conductive lines 540b, 540e in the groups 560 to a first photomask. The assigning module 260 further assigns the vertical conductive lines 530c, 530e, 530f overlaid by the horizontal conductive lines 540c, 540d in the group 570 to a second photomask. The assigning module 260 further assigns the vertical conductive lines 530d, 530g overlaid by the horizontal conductive lines 540c, 540d in the group 570 to a third photomask.

After the cell layout 500 is decomposed for triple-patterning lithography, the cell layout 500 is placed at a location in a layout of a semiconductor device. Operations 310-370 are then repeated to populate the semiconductor device layout with cell layouts. Thereafter, a routing operation is performed on the semiconductor device layout to connect cells to the power supply lines and to other cells and to interconnect cell components, enabling the semiconductor device layout to perform a circuit function.

Figure 6:
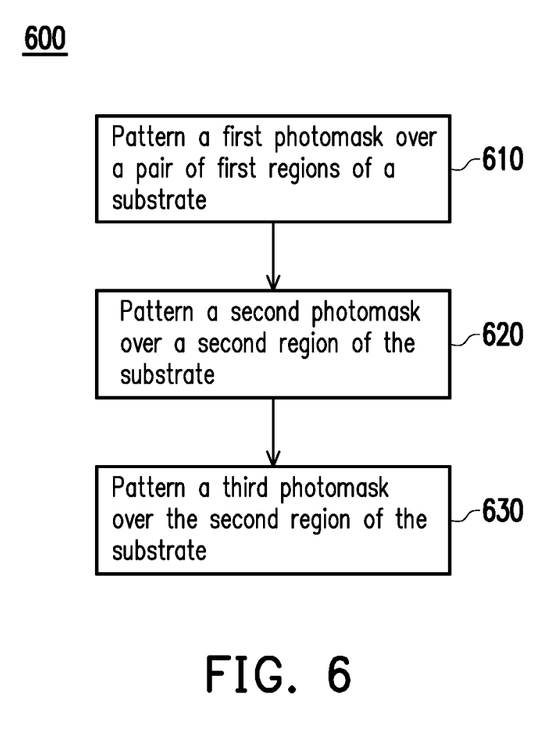
FIG. 6 is a flow chart illustrating another exemplary method of manufacturing a semiconductor device in accordance with some embodiments.

FIG. 6 is a flow chart illustrating another exemplary method 600 of manufacturing a semiconductor device in accordance with some embodiments. The method 600 will now be described with further reference to FIGS. 2 and 5 for ease of understanding. It should be understood that the method 600 is applicable to structures other than those of FIGS. 2 and 5. In operation 610, the patterning module 270 patterns a first photomask over regions 560 of substrate 510 with the vertical conductive lines 530a, 530b, 530h, 530i, 530j. Prior to operation 610, the method 600 further includes: receiving the substrate 510; depositing a first photoresist over the substrate 510; depositing the first photomask over the first photoresist. After operation 610, the method 600 further includes transferring a pattern of the first photomask to the first photoresist; removing the first photomask; etching, such as by the etching module 280, the substrate 510 using the first photoresist as a mask to form via holes; and stripping the first photoresist.

In operation 620, the patterning module 270 patterns a second photomask over a region 570 of the substrate 110 with the vertical conductive lines 530c, 530e, 530f. Each region 560 has a first size. The region 570 is between the regions 560 and has a second size twice the first size. Prior to operation 620, the method 600 further includes: depositing a second photoresist over the substrate 510; depositing the second photomask over the second photoresist. After operation 620, the method 600 further includes: transferring a pattern of the second photomask to the second photoresist; removing the second photomask; etching, such as by the etching module 280, the substrate 510 using the second photoresist as a mask to form via holes; and stripping the second photoresist.

In operation 630, the patterning module 270 patterns a third photomask over the region 570 of the substrate 510 with the vertical conductive lines 530d, 530g. Prior to operation 630, the method 600 further includes: depositing a third photoresist over the substrate 510; depositing the third photomask over the third photoresist. After operation 630, the method 600 further includes: transferring a pattern of the third photomask to the third photoresist; removing the third photomask; etching, such as by the etching module 280, the substrate 510 using the third photoresist as a mask to form via holes; and stripping the third photoresist.

The method 600 further includes: depositing metal in the via holes to form the vertical conductive lines 530a-530j; and depositing metal over the regions 560 of the substrate 510 to form one horizontal conductive line, i.e., the conductive line 540d/540e, over each of the regions 560 of the substrate 510 and two horizontal conductive lines, i.e., the conductive lines 540c, 540d, over the region 570 of the substrate 510.

Figure 7:
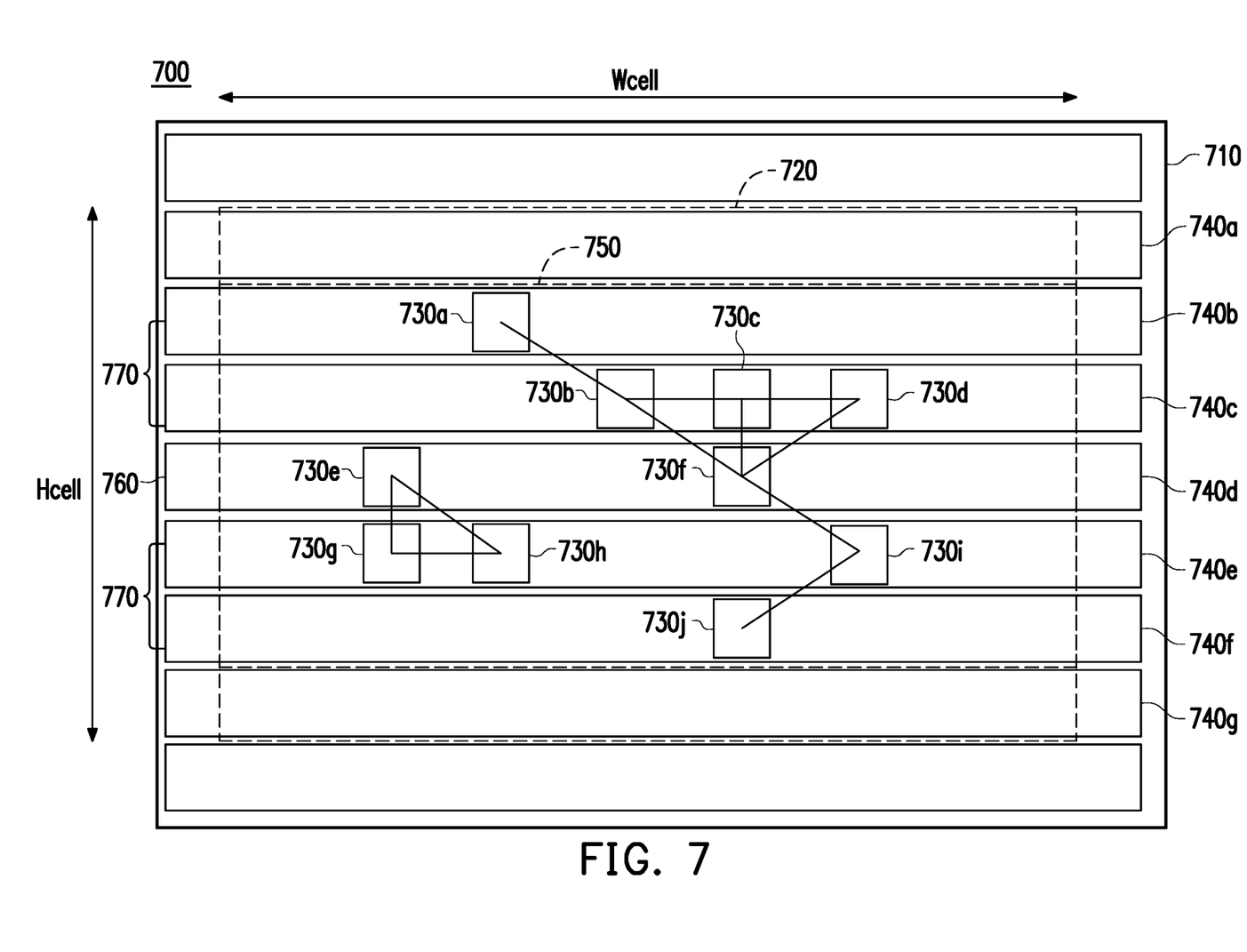
FIG. 7 is a schematic top view illustrating another exemplary layout of a cell in accordance with some embodiments.

FIG. 7 is a schematic view of another exemplary layout 700 of a cell of a semiconductor device in accordance with some embodiments. The semiconductor device includes a substrate 710 and a cell 720. As illustrated in FIG. 7, the cell 720 is enclosed by a boundary (indicated by dash lines), is of a height (Hcell) and a width (Wcell), and includes first and second conductive layers.

The first conductive layer is disposed above the substrate 710 and includes vertical conductive lines 730a-730j that each extend substantially perpendicular to a surface of the substrate 710. The second conductive layer is disposed above the first conductive layer and includes horizontal conductive lines 740a-740g that are arranged in a row and that each extend along the length of the substrate 710.

The method 300 will now be described with further reference to FIGS. 2 and 7 for ease of understanding. It should be understood that the method 300 is applicable to structures other than those of FIGS. 2 and 7. In operation 310, the input receiving module 210 receives an input that represents the layout 700. In operation 320, the boundary defining module 220 defines a boundary 750 that encloses the vertical conductive lines 730a-730j.

In operation 330, the calculating module 230 performs a modulo operation that evaluates the expression, n mod 3, where n is the number of the horizontal conductive lines 740b-740f overlying the vertical conductive lines 730a-730j enclosed by the boundary 750. In this embodiment, the calculating module 230 obtains a 2 because n=5.

In operation 340, the partitioning module 240 partitions the horizontal conductive lines 740b-740f overlying the vertical conductive lines 730a-730j enclosed by the boundary 750 into groups 760, 770. In this embodiment, the partitioning module 240 partitions the horizontal conductive lines 740b-740f such that the groups 760, 770 are alternately arranged from top to bottom of the boundary 750. The partitioning module 240 partitions the horizontal conductive lines 740b-740f starting with a group 770 from the top of the boundary 750 because a 2 value is obtained in operation 330. As illustrated in FIG. 7, the group 760 has one horizontal conductive line, i.e., the conductive line 740d. Each group 770 has two horizontal conductive lines, i.e., the conductive lines 740b/740e, 740c/740f.

The flow proceeds to operation 350. In operation 350, the verifying module 250 verifies whether the vertical conductive lines 730e, 730f overlaid by the horizontal conductive line 740d in the group 760 comply with the minimum pitch rule. If it is verified that the vertical conductive lines 730e, 730f comply with the minimum pitch rule, the flow proceeds to operation 360. Otherwise, the flow terminates and the layout 700 has to be redesigned.

In operation 360, the verifying module 250 verifies whether a layout of the vertical conductive lines 730a, 730b, 730c, 730d, 730g, 730h, 730i, 730j overlaid by the horizontal conductive lines 740b, 740c, 740e, 740f in the groups 570 is decomposable for the double-patterning lithography. If it is verified that the layout of the vertical conductive lines 730a, 730b, 730c, 730d, 730g, 730h, 730i, 730j is decomposable for the double-patterning lithography, the flow proceeds to operation 370. Otherwise, the flow terminates and the layout 700 has to be redesigned.

In operation 370, the assigning module 260 assigns the vertical conductive lines 730e, 730f overlaid by the horizontal conductive line 740d in the group 760 to a first photomask. The assigning module 260 further assigns the vertical conductive lines 730a, 730c, 730h, 730j overlaid by the horizontal conductive lines 740b, 740c, 740e, 740f in the groups 770 to a second photomask. The assigning module 260 further assigns the vertical conductive lines 730*b*, 730*d*, 730*g*, 730*i* overlaid by the horizontal conductive lines 740*c*, 740*e* in the groups 770 to a third photomask.

After the cell layout 700 is decomposed for triple-patterning lithography, the cell layout 700 is placed at a location in a layout of a semiconductor device. Operations 310-370 are then repeated to populate the semiconductor device layout with cell layouts. Thereafter, a routing operation is performed on the semiconductor device layout to connect cells to the power supply lines and to other cells and to interconnect cell components, enabling the semiconductor device layout to perform a circuit function.

Figure 8:
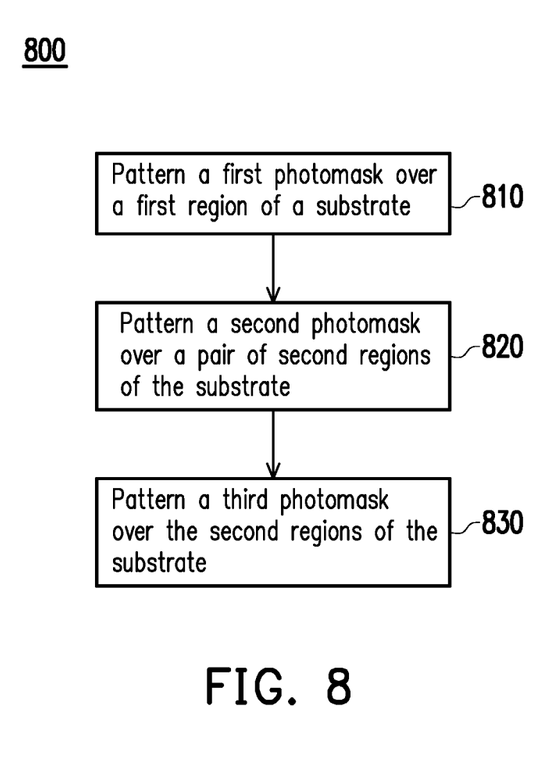
FIG. 8 is a flow chart illustrating another exemplary method of manufacturing a semiconductor device in accordance with some embodiments.

FIG. 8 is a flow chart illustrating an exemplary method 800 of manufacturing a semiconductor device in accordance with some embodiments. The method 800 will now be described with further reference to FIGS. 2 and 7 for ease of understanding. It should be understood that the method 800 is applicable to structures other than those of FIGS. 2 and 7. In operation 810, the patterning module 270 patterns a first photomask over a region 760 of the substrate 710 with the vertical conductive lines 730*e*, 730*f*. Prior to operation 810, the method 800 further includes: receiving the substrate 710; depositing a first photoresist over the substrate 710; depositing the first photomask over the first photoresist. After operation 810, the method 800 further includes transferring a pattern of the first photomask to the first photoresist; removing the first photomask; etching, such as by the etching module 280, the substrate 710 using the first photoresist as a mask to form via holes; and stripping the first photoresist.

In operation 820, the patterning module 270 patterns a second photomask over regions 770 of the substrate 710 with the vertical conductive lines 730*a*, 730*c*, 730*h*, 730*j*. The region 760 is between the regions 770 and has a first size. Each region 770 has a second size twice the first size. Prior to operation 820, the method 800 further includes: depositing a second photoresist over the substrate 710; depositing the second photomask over the second photoresist. After operation 820, the method 800 further includes: transferring a pattern of the second photomask to the second photoresist; removing the second photomask; etching, such as by the etching module 280, the substrate 710 using the second photoresist as a mask to form via holes; and stripping the second photoresist.

In operation 830, the patterning module 270 patterns a third photomask over the regions 770 of the substrate 710 with the vertical conductive lines 730*b*, 730*d*, 730*g*, 730*i*. Prior to operation 830, the method 800 further includes: depositing a third photoresist over the substrate 710; depositing the third photomask over the third photoresist. After operation 830, the method 800 further includes: transferring a pattern of the third photomask to the third photoresist; removing the third photomask; etching, such as by the etching module 280, the substrate 710 using the third photoresist as a mask to form via holes; and stripping the third photoresist.

The method 800 further includes: depositing metal in the via holes to form the vertical conductive lines 730*a*-730*j*; and depositing metal over the region 760 of the substrate 710 to form one horizontal conductive line, i.e., the conductive line 740*d*, over the region 760 of the substrate, and two horizontal conductive lines, i.e., the conductive lines 740*b*/740*e*, 740*c*/740*f*, over each of the regions 770 of the substrate 710.

Figure 9:
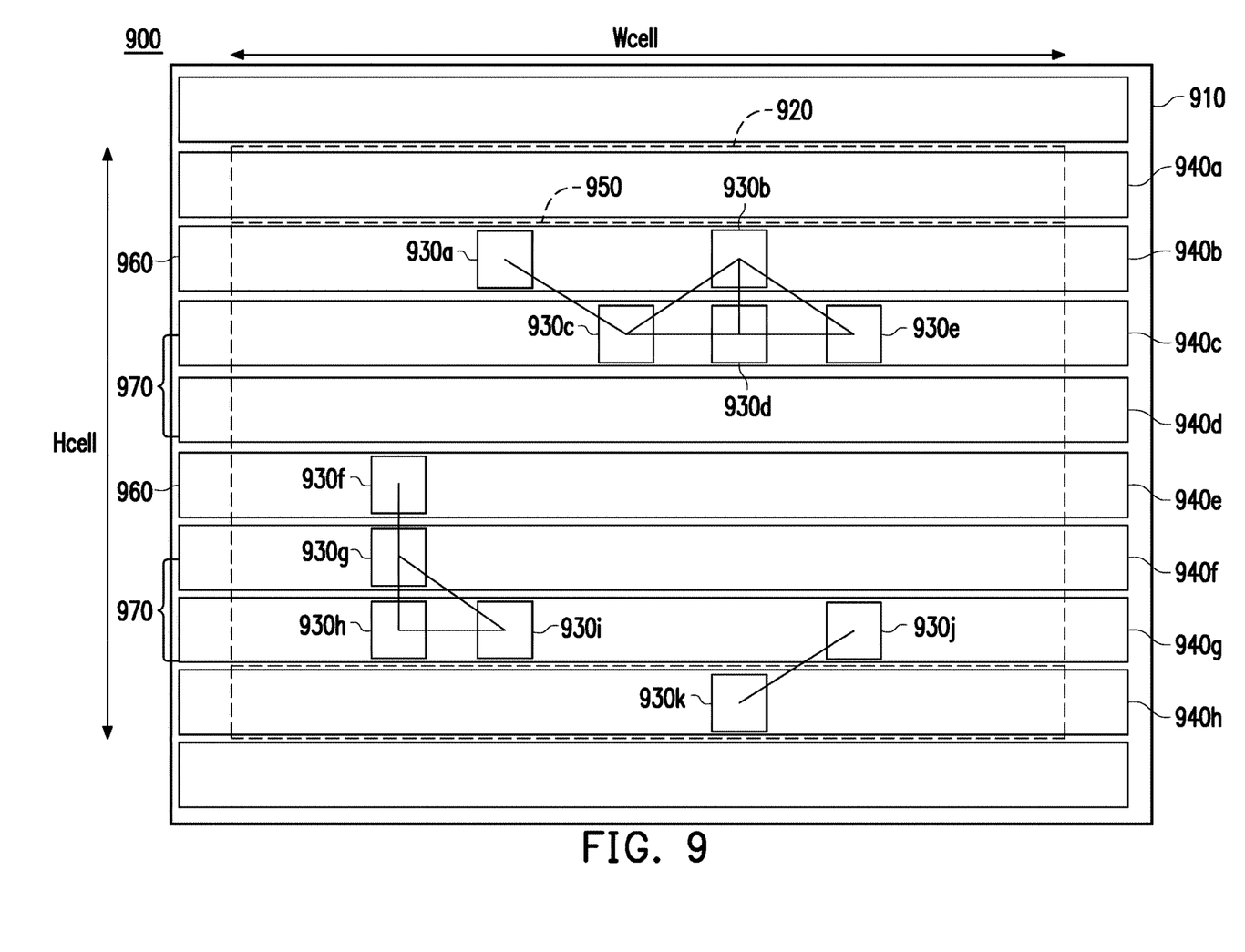
FIG. 9 is a schematic top view illustrating another exemplary layout of a cell in accordance with some embodiments.

FIG. 9 is a schematic view of another exemplary layout 900 of a cell of a semiconductor device in accordance with some embodiments. The semiconductor device includes a substrate 910 and a cell 920. As illustrated in FIG. 9, the cell 920 is enclosed by a boundary (indicated by dash lines), is of a height (Hcell) and a width (Wcell), and includes first and second conductive layers.

The first conductive layer is disposed above the substrate 910 and includes vertical conductive lines 930*a*-930*k* that each extend substantially perpendicular to a surface of the substrate 910. The second conductive layer is disposed over the first conductive layer and includes horizontal conductive lines 940*a*-940*h* that are arranged in a row and that each extend along the length of the substrate 910.

The method 300 will now be described with further reference to FIGS. 2 and 9 for ease of understanding. It should be understood that the method 300 is applicable to structures other than those of FIGS. 2 and 9. In operation 310, the input receiving module 210 receives an input that represents the layout 900. In operation 320, the boundary defining module 220 defines a boundary 950 that encloses the vertical conductive lines 930*a*-930*k*.

In operation 330, the calculating module 230 performs a modulo operation that evaluates the expression, n mod 3, where n is the number of the horizontal conductive lines 940*b*-940*g* overlying the vertical conductive lines 930*a*-930*k* enclosed by the boundary 950. In this embodiment, the calculating module 230 obtains a 0 because n=6.

In operation 340, the partitioning module 240 partitions the horizontal conductive lines 940*b*-940*g* overlying the vertical conductive lines 930*a*-930*k* enclosed by the boundary 950 into groups 960, 970. In this embodiment, the partitioning module 240 partitions the horizontal conductive lines 940*b*-940*g* such that the groups 960, 970 are alternately arranged from top to bottom of the boundary 950. The partitioning module 240 partitions the horizontal conductive lines 940*b*-940*g* starting with a first group 960 from the top of the boundary 950 because a 0 value is obtained in operation 330. As illustrated in FIG. 9, each group 960 has one horizontal conductive line, i.e., the conductive line 940*b*/940*e*. Each group 970 has two horizontal conductive lines, i.e., the conductive lines 940*c*/940*f*, 940*d*/940*g*.

The flow proceeds to operation 350. In operation 350, the verifying module 250 verifies whether the vertical conductive lines 930*a*, 930*b*, 930*g* overlaid by the horizontal conductive line 940*a*, 940*e* in the groups 960 comply with the minimum pitch rule. If it is verified that the vertical conductive lines 930*a*, 930*b*, 930*g* comply with the minimum pitch rule, the flow proceeds to operation 360. Otherwise, the flow terminates and the layout 900 has to be redesigned.

In operation 360, the verifying module 250 verifies whether a layout of vertical conductive lines 930*c*, 930*d*, 930*e*, 930*f*, 930*h*, 930*i*, 930*j*, 930*k* overlaid by the horizontal conductive lines 940*c*, 940*d*, 940*f*, 940*g* in the groups 970 is decomposable for the double-patterning lithography. If it is verified that the layout of the vertical conductive lines 930*c*, 930*d*, 930*e*, 930*f*, 930*h*, 930*i*, 930*j*, 930*k* is decomposable for the double-patterning lithography, the flow proceeds to operation 370. Otherwise, the flow terminates and the layout 900 has to be redesigned.

In operation 370, the assigning module 260 assigns the vertical conductive lines 930*a*, 930*b*, 930*g* overlaid by the horizontal conductive lines 940*b*, 940*e* in the groups 960 to a first photomask. The assigning module 260 further assigns the vertical conductive lines 930*c*, 930*e*, 930*h*, 930*j* overlaid by the horizontal conductive lines 940*c*, 940*f* in the groups 970 to a second photomask. The assigning module 260 further assigns the vertical conductive lines 930*d*, 930*f*, 930*i*, 930*k* overlaid by the horizontal conductive lines 940*c*, 940*d*, 940*f*, 940*g* in the groups 970 to a third photomask.

After the cell layout 900 is decomposed for triple-patterning lithography, the cell layout 900 is placed at a location in a layout of a semiconductor device. Operations 310-370 are then repeated to populate the semiconductor device layout with cell layouts. Thereafter, a routing operation is performed on the semiconductor device layout to connect cells to the power supply lines and to other cells and to interconnect cell components, enabling the semiconductor device layout to perform a circuit function.

Figure 10:
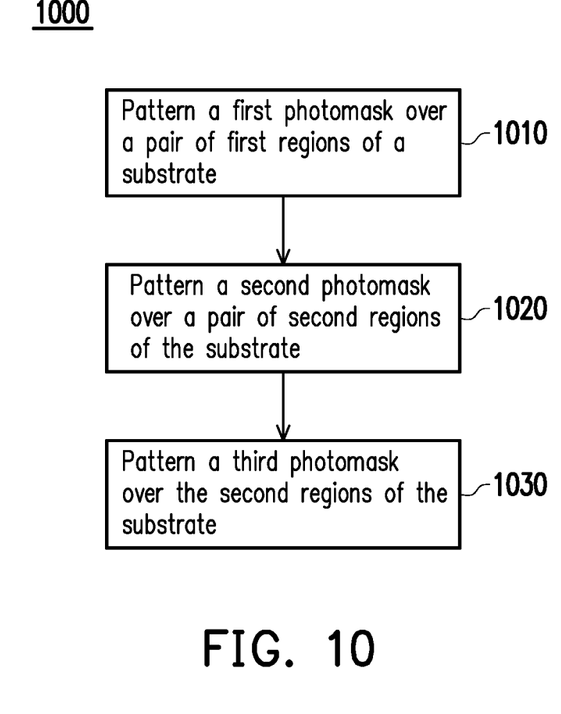
FIG. 10 is a flow chart illustrating another exemplary method of manufacturing a semiconductor device in accordance with some embodiment.

FIG. 10 is a flow chart illustrating an exemplary method 1000 of manufacturing a semiconductor device in accordance with some embodiments. The method 1000 will now be described with further reference to FIGS. 2 and 9 for ease of understanding. It should be understood that the method 1000 is applicable to structures other than those of FIGS. 2 and 9. In operation 1010, the patterning module 270 patterns a first photomask over regions 960 of the substrate 910 with the vertical conductive lines 930*a*, 930*b*, 930*g*. Prior to operation 1010, the method 1000 further includes: receiving the substrate 910; depositing a first photoresist over the substrate 910; depositing the first photomask over the first photoresist. After operation 1010, the method 900 further includes transferring a pattern of the first photomask to the first photoresist; removing the first photomask; etching, such as by the etching module 280, the substrate 910 using the first photoresist as a mask to form via holes; and stripping the first photoresist.

In operation 1020, the patterning module 270 patterns a second photomask over regions 970 of the substrate 910 with the vertical conductive lines 930*c*, 930*e*, 930*h*, 930*j*. The regions 960, 970 are alternately arranged. Each region 960 has a first size. Each region 970 has a second size twice the first size. Prior to operation 1020, the method 1000 further includes: depositing a second photoresist over the substrate 910; depositing the second photomask over the second photoresist. After operation 1020, the method 1000 further includes: transferring a pattern of the second photomask to the second photoresist; removing the second photomask; etching, such as by the etching module 280, the substrate 910 using the second photoresist as a mask to form via holes; and stripping the second photoresist.

In operation 1030, the patterning module 270 patterns a third photomask over the regions 970 of the substrate 910 with the vertical conductive lines 930*d*, 930*f*, 930*i*, 930*k*. Prior to operation 1030, the method 1000 further includes: depositing a third photoresist over the substrate 910; depositing the third photomask over the third photoresist. After operation 1030, the method 1000 further includes: transferring a pattern of the third photomask to the third photoresist; removing the third photomask; etching, such as by the etching module 280, the substrate 910 using the third photoresist as a mask to form via holes; and stripping the third photoresist.

The method 1000 further includes: depositing metal in the via holes to form the vertical conductive lines 930*a*-930*k*; and depositing metal over the regions 960 of the substrate 910 to form one horizontal conductive line, i.e., the conductive line 940*b*/940*e*, over each of the regions 960 of the substrate 910, and two horizontal conductive lines, i.e., the conductive lines 940*c*/940*f*, 940*d*/940*g*, over each of the regions 970 of the substrate 910.

In an embodiment, a method of decomposing a layout for multiple-patterning lithography comprises receiving an input that represents a layout of a semiconductor device. The layout includes a plurality of conductive lines of a cell. A first set of conductive lines are overlaid by a second set of conductive lines. The method further comprises partitioning the second set of conductive lines into groups. A first group has a different number of conductive lines from the second set than a second group. The method further comprises assigning conductive lines from the first set that are overlaid by conductive lines of the first group to a first photomask and assigning conductive lines from the first set that are overlaid by conductive lines of the second group to second and third photomasks.

In another embodiment, a system comprises an input receiving module, a partitioning module, and a patterning module. The input receiving module is configured to receive an input that represents a layout of a semiconductor device. The layout includes a plurality of conductive lines of a cell. A first set of conductive lines is overlaid by a second set of conductive lines. The partitioning module is coupled to the input receiving module and is configured to partition the second set of conductive lines into groups. A first group has a different number of conductive lines from the second set than a second group. The patterning module is coupled to the partitioning module and is configured to pattern a first photomask with conductive lines from the first set overlaid by conductive lines of the first group and to pattern second and third photomasks with conductive lines from the first set overlaid by conductive lines of the second group.

In another embodiment, a method of manufacturing a semiconductor device comprises: patterning a first photomask over a first region of a substrate with a layout of a first conductive line of a cell; patterning a second photomask over a second region of the substrate with a layout of a second conductive line of the cell; and patterning a third photomask over the second region of the substrate with a layout of a third conductive line of the cell. The second region of the substrate has a size substantially twice a size of the first region of the substrate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for deploying a system for decomposing a layout for fabricating a semiconductor device using multiple-patterning lithography for transferring a photomask pattern to a photoresist, the method comprising:

deploying an input receiving module configured to receive an input that represents a layout of a semiconductor device, the layout including a plurality of conductive lines of a cell;

deploying a partitioning module coupled to the input receiving module and configured to partition a second set of conductive lines into groups, a first group having a different number of conductive lines from the second set than a second group; and deploying a patterning module coupled to the partitioning module and configured to pattern a first photomask with conductive lines from a first set of conductive lines overlaid by conductive lines of the first group and to pattern second and third photomasks with conductive lines from the first set overlaid by conductive lines of the second group.

2. The method of claim 1, further comprising deploying an assigning module coupled between the partitioning module and the patterning module.

3. The method of claim 2, wherein the assigning module is configured to assign conductive lines from the first set overlaid by conductive lines of the first group to the first photomask.

4. The method of claim 1, further comprising deploying a second assigning module coupled between the partitioning module and the patterning module.

5. The method of claim 4, wherein the second assigning module is configured to assign conductive lines from the first set overlaid by conductive lines of the second group to second and third photomasks.

6. The method of claim 1, further comprising deploying a calculating module coupled between the input receiving module and the partitioning module.

7. The method of claim 6, wherein the calculating module is configured to perform a modulo operation that evaluates an expression, n mod 3, n is the number of conductive lines from the second set.

8. The method of claim 7, further comprising deploying a boundary defining module coupled between the input receiving module and the calculating module.

9. The method of claim 8, wherein the boundary defining module is configured to define a boundary that encloses the first set of conductive lines.

10. The method of claim 9, wherein the partitioning module partitions the second set of conductive lines starting with a first group from a top of the boundary when the calculating module obtains a value of 0 or 1.

11. A system for decomposing a layout for fabricating a semiconductor device using multiple-patterning lithography for transferring a photomask pattern to a photoresist, the system comprising:
   an input receiving module configured to receive an input that represents a layout of a semiconductor device, the layout including a plurality of conductive lines of a cell, a first set of conductive lines being overlaid by a second set of conductive lines;
   a partitioning module coupled to the input receiving module and configured to partition the second set of conductive lines into groups; and
   a patterning module coupled to the partitioning module and configured to pattern a first photomask with conductive lines from the first set overlaid by conductive lines of a first group and to pattern second and third photomasks with conductive lines from the first set overlaid by conductive lines of a second group.

12. The system of claim 11, further comprising an assigning module coupled between the partitioning module and the patterning module.

13. The system of claim 12, wherein the assigning module is configured to assign conductive lines from the first set overlaid by conductive lines of the first group to the first photomask.

14. The system of claim 11, further comprising a second assigning module coupled between the partitioning module and the patterning module.

15. The system of claim 14, wherein the second assigning module is configured to assign conductive lines from the first set overlaid by conductive lines of the second group to second and third photomasks.

16. The system of claim 11, further comprising a calculating module coupled between the input receiving module and the partitioning module.

17. A system for decomposing a layout for fabricating a semiconductor device using multiple-patterning lithography for transferring a photomask pattern to a photoresist, the system comprising:
   means for receiving an input that represents a layout of a semiconductor device, the layout including a plurality of conductive lines of a cell;
   means for partitioning a second set of conductive lines into groups, a first group having a different number of conductive lines from the second set than a second group; and
   means for patterning a first photomask with conductive lines from a first set of conductive lines overlaid by conductive lines of the first group and to pattern second and third photomasks with conductive lines from the first set overlaid by conductive lines of the second group.

18. The system of claim 17, further comprising: means for assigning conductive lines from the first set overlaid by conductive lines of the second group to second and third photomasks.

19. The method of claim 18, further comprising: means for performing a modulo operation that evaluates an expression, n mod 3, n is the number of conductive lines from the second set.

20. The method of claim 19, further comprising: means for defining a boundary that encloses the first set of conductive lines.

* * * * *